US012714999B2

(12) United States Patent
Möschl et al.

(10) Patent No.: US 12,714,999 B2
(45) Date of Patent: Aug. 25, 2026

(54) AGITATOR MILL

(71) Applicant: Netzsch-Feinmahltechnik GmbH, Selb (DE)

(72) Inventors: Holger Möschl, Selb (DE); Robert Grandl, Selb (DE)

(73) Assignee: NETZSCH-Feinmahltechnik-GmbH, Selb (DE)

( * ) Notice: Subject to any disclaimer, the term of this patent is extended or adjusted under 35 U.S.C. 154(b) by 297 days.

(21) Appl. No.: 18/482,203

(22) Filed: Oct. 6, 2023

(65) Prior Publication Data

US 2024/0207864 A1 Jun. 27, 2024

(30) Foreign Application Priority Data

Oct. 7, 2022 (DE) ..................... 10 2022 125 879.3

(51) Int. Cl.
*B02C 17/16* (2006.01)

(52) U.S. Cl.
CPC .................................. *B02C 17/161* (2013.01)

(58) Field of Classification Search
CPC ....... B02C 17/161; B02C 17/10; B02C 17/16; B02C 17/1855; B02C 17/183
See application file for complete search history.

(56) References Cited

U.S. PATENT DOCUMENTS 7,845,589 B2 * 12/2010 Pausch .................. B02C 17/161 241/171

FOREIGN PATENT DOCUMENTS

EP 0206207 A2 * 12/1986 ........... B02C 17/161

OTHER PUBLICATIONS

Translation of EP-0206207.*

* cited by examiner

*Primary Examiner* — Bobby Yeonjin Kim
(74) *Attorney, Agent, or Firm* — Whitmyer IP Group LLC

(57) ABSTRACT

An agitator mill including a milling chamber and a milling rotor, which forms a circumferential boundary wall of the milling chamber during operation. The milling elements are made to execute a milling movement in the milling chamber by the milling rotor. There is also a slit tube for removing the milled material while separating out the milling elements.

9 Claims, 15 Drawing Sheets

AGITATOR MILL

TECHNICAL FIELD

The invention relates to an agitator mill and to a slit tube.

BACKGROUND

Agitator mills are used to deagglomerate solids and to reduce the particle size within a suspension or dispersion to be milled in a size range of several hundred micrometres to as low as a few nanometres.

The processes taking place within an agitator mill is explained below with reference to FIG. 1.

FIG. 1 schematically shows an agitator mill 1 having a horizontal milling rotor 3 (often also referred to as agitator shaft). The milling elements situated in the milling container 13, which are generally in the form of steel or ceramic agitators, are not shown.

During operation of the agitator mill 1, the material to be milled is pumped via the inlet 14 of the agitator mill 1 into or through the milling chamber 2 enclosed by the milling container 13.

By means of a rotational movement of the milling rotor 3, the agitating elements 4 connected in a rotationally fixed manner to the milling rotor 3, which are often also referred to as milling discs, are set in rotation.

To generate the rotational movement, the milling rotor 3 can, for example, be driven by an electric motor via a belt drive (not shown). The drive of the agitator mill 1 is usually situated in a housing adjacent to the milling container 13.

As a result of the rotation of the agitating elements 4, the milling elements situated in the milling chamber 2 and in the vicinity of the agitating elements 4 are carried along in the circumferential direction of the milling container 13. As soon as they have reached the peak region in the central region between each pair of agitating elements 4, the moving milling elements flow back in the direction of the milling rotor 3. A circulating movement of the milling elements is thus produced between each pair of agitating elements 4. In order to achieve the finest possible particle sizes in the micrometre or nanometre range, milling elements with a size of between 30 μm and 6 mm are ideally used.

The movement of the milling elements causes collisions between the solids of the milled material suspension pumped through the milling chamber 2 and the milling elements. These collisions cause fine particles to split off from the solids in the milled material suspension, so that the solids arising at the outlet 15 of the agitator mill 1 are ultimately much smaller than the solids supplied at the inlet 14. The maximum achievable comminution depends directly on the size of the milling elements and on the introduced energy of the agitating elements 4 and the dwell time of the milled material suspension in the milling chamber 2.

To ensure that no milling elements are removed from the milling chamber 2, a separating system 6, for example in the form of a screen, a filter, or a slit tube (the term "screen" below is intended to include all types of separating systems) is also attached in front of the outlet 15 via which the milled material is removed.

To prevent the milling elements from exiting the milling container, screens having slit sizes approximately 1.5 to 4 times smaller than the grain size of the milling elements are typically used.

The problem with this is that a reduction in the slit sizes while the total diameter of the screen stays the same results in a reduction in the free total flow area of the screen. In theory, the number of slits could be increased such that the free flow area ultimately remains constant.

However, since the slits must be surrounded by a certain minimum material thickness for strength reasons, it is typically not possible in practice to increase the number of slits while reducing the slit sizes such that the total flow area remains constant. The reduction in the free total flow area of the screen ultimately results in an increase in the flow speed of the milled material flowing away through the slits. This in turn results in an increased suction or force effect of the milling elements situated in the screen region in the direction of the slits. The milling elements are therefore pressed against the screen and ultimately block the screen openings or slits. This ultimately means that no or only insufficient milled material can flow out of the milling chamber through the screen, and the screen must be cleaned. The screen must be removed in the process, which is associated with maintenance costs and an increase in the stoppage time of the agitator mill.

FIGS. 2-10 show separating systems in the form of slit tubes as have been previously used internally but have been found worthy of improvement.

FIGS. 2-5 show a radial slit tube. In this, the slit formers 7 are wound spirally onto the supports 16, so that the slits 8 situated between the slit formers 7 likewise run spirally around the longitudinal axis of the slit tube 6. As can be seen in FIG. 5, the milling elements 5 move together with the milled material in the direction of the slits 8. A particular disadvantage of the radial slit tubes is that the milling elements 5 in the region of the slit tube 6 move in a circle around the longitudinal axis of the slit tube 6 anyway during operation of the agitator mill. The milling elements 5 accordingly move virtually parallel to the slits 8. This makes it particularly easy for the milling elements 5 to find their way into the slits 8 or the entry regions thereof and to block them.

Owing to the aforementioned problems with radial slit tubes, axial slit tubes, as shown in FIGS. 6-9, were used in internal experiments. In these, the slit formers 7 between which the slits remain free are arranged on the supports 16 parallel to the longitudinal axis of the slit tube 6. As can be seen from FIG. 9, the milling elements 5 rotating in the milling chamber therefore do not move parallel or virtually parallel to the longitudinal direction of the slits 8 but roll or slide beyond the slits at an angle of approximately 90° to the longitudinal direction of the slits. This means that the milling elements 5 do not tend from the start to block the slits 8 or the entry regions thereof. Upwards of a certain flow speed at the slits 8, however, an increased accumulation of milling elements 5 in the slits 8 or the entry regions thereof occurs with the axial slit tubes too.

SUMMARY

In view of this, the object of the invention is to create an agitator mill in which the milling elements are separated reliably from the milled material, ideally also at elevated flow speeds in the region of the slit tube.

According to the invention, this problem is solved by the features of the main claim directed to the agitator mill.

Accordingly, the problem is solved with an agitator mill having a milling chamber, a milling rotor and milling elements, and a slit tube. During operation, the milling rotor forms a circumferential boundary wall of the milling chamber, and the milling elements are made to execute a milling movement in the milling chamber by the milling rotor. The slit tube is used to remove the milled material while separating out the milling elements. The agitator mill is characterised in that the slit tube is an axial slit tube.

The slit formers of the axial slit tube which are adjacent in the circumferential direction form a slit between their two long edges, which slit is assigned a disruptive geometry. The disruptive geometry causes a milling element rolling or sliding in the circumferential direction along the outside surface of the slit tube to lift off from the outer circumferential face as it crosses the slit. The outer circumferential face is defined by the slit formers.

The milled material exits the agitator mill by flowing out through the slits of the slit tube, into the interior of the slit tube, and from there out of the agitator mill.

To this end, the slit tube is arranged in the region of the outlet of the agitator mill and has an opening in the end face facing away from the agitator mill. On the end face protruding into the agitator mill, however, the slit tube is closed or at least created such that the milling elements cannot pass from there into the interior of the slit tube.

The slit tube has the function of preventing the milling elements from exiting the agitator mill. Accordingly, it assumes the function of a screen. The screen area of the slit tube is formed by slit formers. In this context, screen area means the area which has holes for a certain medium, in the present case the milled material, which are in turn not large enough to allow a further medium, in the present case the milling elements, to pass through. These are sections of the slit tube between which there is a slit through which access to the hollow interior of the slit tube is permitted. The slit formers can be formed as strips, wires or else from an integral hollow cylinder with multiple slits made therein.

The advantage of a slit tube according to the invention over conventional slit tubes is that blockage of the slits or the entry regions thereof by milling elements is prevented or at least greatly limited.

To bring this about, the slit tube is provided with a disruptive geometry or multiple disruptive geometries on its outer circumferential face. The disruptive geometry is a section of the slit tube which moves a milling element sliding along the outer circumferential face of the slit tube to lift off from the outer circumferential face directly before each slit. However, the milling element is not or only insignificantly braked in the process. It therefore continues to execute a rotational movement around the longitudinal axis of the slit tube. As a result, the milled material flows under the milling element after the latter lifts off from the outer circumferential face. According to the boundary layer theory, the milled material flowing in the boundary layer between the outer circumferential face of the slit tube and the milling element has a lower flow speed than the milled material flowing past the opposite side of the milling element. According to Bernoulli, this means that a negative pressure prevails between the milling element and the outer circumferential face of the slit tube in relation to the pressure on the side of the milling element facing away from the slit tube. For this reason, the milling element is pushed away from the outer circumferential face of the slit tube. In the case of rotating milling elements, the movement of the milling element away from the outer circumferential face of the slit tube is also intensified by the so-called Magnus effect.

The shape of the disruptive geometry can be implemented in different ways. For example, ramp-like obstacles on the outer circumferential face of the slit tube directly before each slit are conceivable. Where an axial slit tube consists of bar-like slit formers, for example, these bar-like slit formers can have a ski-jump-shaped lip, i.e., a type of "spoiler", at the edge over which the milling elements run towards the next slit during operation. This lip or spoiler is shaped such that the milling element meeting it is moved to lift off from the outer circumferential face directly in front of the next slit.

The term "axial slit tube" is used here in a broader and a narrower sense.

In the broader sense of this term, it can be an axial helical slit tube. This is a slit tube with slits running around in the manner of a helical line at a tangent angle T of less than 45°, better less than 30° and ideally less than 20°, but more than 5°. The term tangent angle means the smallest angle formed by the tangent applied locally at the longitudinal axis of the respective slit with the longitudinal axis of the slit tube, when they are both projected onto one another.

The term "axial slit tube" in its narrower sense defines a true "axial slit tube" and thus means that the slits of the slit tube run, in relation to their longitudinal axis, parallel or (within the meaning defined above) at least virtually (+/−2° and less) or substantially parallel to the longitudinal axis of the slit tube.

The "outer circumferential face" of the slit tube refers to the total, running 360° around the longitudinal axis of the slit tube, of the faces of the individual slit formers facing away from the longitudinal axis of the slit tube.

It should also be noted that it is optimal when each slit is provided with a corresponding disruptive geometry. This is not absolutely necessary in all cases, however. In some cases, there can be a compromise when only some slits are equipped according to the invention, preferably those which are arranged alternatingly with conventional slits always according to the same schema.

The object of the invention is also to create, with simplified means which are as far as possible subject to wear only to a reduced extent, a slit tube with which milling elements can be separated reliably from the milled material, while ideally also maintaining the necessary flow speed.

The aforementioned problem is solved with a slit tube for an agitator mill according to the other independent claim 2. The slit tube is characterised in that it is an axial slit tube. The slit formers of the axial slit tube which are adjacent in the circumferential direction form a slit between their two long edges. The slit is assigned a disruptive geometry, which causes a milling element rolling or sliding in the circumferential direction along the outside surface of the slit tube to lift off from the outer circumferential face as it crosses the slit. The outer circumferential face is defined by the slit formers.

In this aspect of the invention, the disruptive geometry is implemented in a particular way, specifically in that adjacent slit formers form a stepped slit between their two long edges, in the sense that the long edge, bounding the slit, of one slit former lies on a smaller radius than the long edge, bounding the same slit, of the other slit former lying ahead in the movement direction of the milling elements. This means that a milling element reaches each slit via its radially outer edge and then crosses the slit in order then to fly at a distance over the other, radially inner edge of the same slit. In other words: Precisely in this way, the milling elements flowing in approximately the circumferential direction along the slit tube at the outer circumferential face thereof can be caused to "jump", in a manner unbraked or substantially unbraked by the surface of the slit former which they are in the process of crossing, beyond the slit to the next slit former, without immediately "landing" on the surface of the next slit former. Instead, they pass through the next slit former close to the surface initially, where the flow passes under them, and as a result they receive a thrust in the radially outward direction.

Such a slit tube or stepped slit tube can be retrofitted into an agitator mill. Owing to the above-described effect of the flow passing under milling elements sliding along the outer circumferential face of the slit tube, the installation of such a slit tube means that the stoppage time of the agitator mill can be considerably reduced. This is because such a slit tube does not have to be cleaned, or has to be cleaned much less often, unlike conventional separating systems.

There are several possible ways of designing the invention such that its effectiveness or usability is improved even further.

In a preferred embodiment, the slit formers are strips. The cross-section of the strips, in relation to the rotational axis of the slit tube, in each case defines a flat structure, which is fixed to the slit tube such that there is no symmetry relative to the rotational axis of the slit tube.

Ideally, the strips are formed from wires. This is advantageous for manufacturing reasons. If the strips or slit formers consist of wires, the slit tube can be produced using a relatively fast method, which is described below.

First, multiple connecting pieces, ideally not consisting of the wire forming the slit formers, are positioned, or clamped at regular intervals in a circle. Then the wire which forms the slit formers in the assembled state is wound around these connecting pieces and welded thereto with a slit between the individual windings. This results in substantially the geometry of a radial slit tube as described above with reference to FIG. 2. The radial slit tube thus formed is finally disconnected along its longitudinal axis and unwound so that all the slit formers lie in one plane. Finally, the plane thus formed is rotated by 90°, wound up again in a circle and closed again by welding, for example. As a result, a slit tube having slits running parallel to the longitudinal axis is produced.

Because the cross-sectional areas of the slit formers are not arranged symmetrically relative to the longitudinal axis, the above-described stepped slit can be produced simply between each pair of successive slit formers. The non-existent symmetry in this sense means an axial symmetry of each slit former cross-section in relation to a plane in which the longitudinal axis of the slit tube lies.

However, it can be an attractive option to choose a design in which each pair of opposing slit former cross-sections are arranged point-symmetrically about the longitudinal axis.

The term "strips" preferably describes a geometry in which the length parallel to the rotational axis of the slit tube is at least 10 times and better at least 15 times longer than in the circumferential direction.

Ideally, the slit formers are strips, the cross-section of which, in relation to the rotational axis of the slit tube, becomes narrower and narrower in the radially inward direction, as seen in the circumferential direction.

As a result, the slit width increases from the narrowest point at the level of the outer circumferential face of the slit tube towards the interior of the slit tube. This has the advantage that, if milling elements undesirably still get stuck in the slit, they can be washed out of the slit again more easily or the slit tube as a whole can be cleaned more easily.

The "radially inward" direction describes the direction from the outer circumferential face of the slit tube towards the interior of the slit tube.

Preferably, the slit formers are strips, the cross-section of which, in relation to the longitudinal axis (and rotational axis) of the slit tube, is in each case a wedge and preferably a double wedge. In this case, the base of the wedge opposite the inner wedge tip defines the outer circumferential face.

The wedge sides accordingly form the slit walls. Preferably, the slit walls have an angle of between 68° and 85° in the region directly adjacent to the outer circumferential face. From a certain slit depth, the wedge sides then preferably have an angle of 60° to 80°. The slit then becomes wider overall from the kink in the slit walls thus created. As a result, a high strength of the slit formers in the region of the outer circumferential face is achieved owing to the greater material thickness in this region. At the same time, the slit can be cleaned well from the inside.

The term "double wedge" describes a geometry which results from a trapezium which merges into a triangle, wherein the angle between the base of the triangle and its respective side (referred to below as $\alpha$) is not equal to the angle between the base of the trapezium and its respective side (referred to below as $\beta$). Preferably, the angle $\alpha$ is smaller than the angle $\beta$. A "double wedge" thus preferably has at least one first and one second wedge section.

In a further preferred embodiment, the perpendicular on the said base of the wedge and running through the inner wedge tip, does not intersect the rotational axis of the slit tube. Instead, it passes the rotational axis at a significant distance. The distance is ideally at least twice, better at least four times the maximum wedge width in the circumferential direction.

The base is thus not arranged orthogonally to a plane in which the longitudinal axis of the slit tube lies. As a result, milling elements rolling or sliding on the outer circumferential face forming the base are conveyed over the slit between two slit formers in the manner of a ski jump. At the moment at which the milling element is over a slit, flow accordingly passes under it, as already described above.

Ideally, the slit tube is an axial slit tube, the slit formers of which, which are adjacent in the circumferential direction, form a stepped slit between their two long edges. Stepped slit means in this sense that the long edge, bounding the slit, of one slit former lies on a smaller radius than the long edge, bounding the same slit, of the other slit former.

With such a slit tube, flow passes under milling elements sliding or flowing along the outer circumferential face of the slit tube as soon as they reach the slit. This means, as already described above, that the milling elements are pushed away from the slit tube instead of passing into the slit.

Such a slit tube can be exchanged with a conventional separating system of an agitator mill in order to reduce the stoppage times of the agitator mill resulting from cleaning work.

Independent protection is also claimed for the use of a slit tube according to either of claim 7 or 8 in a mill and preferably an agitator mill for removing the milled material while separating out milling elements.

DETAILED DESCRIPTION

Figure 14:
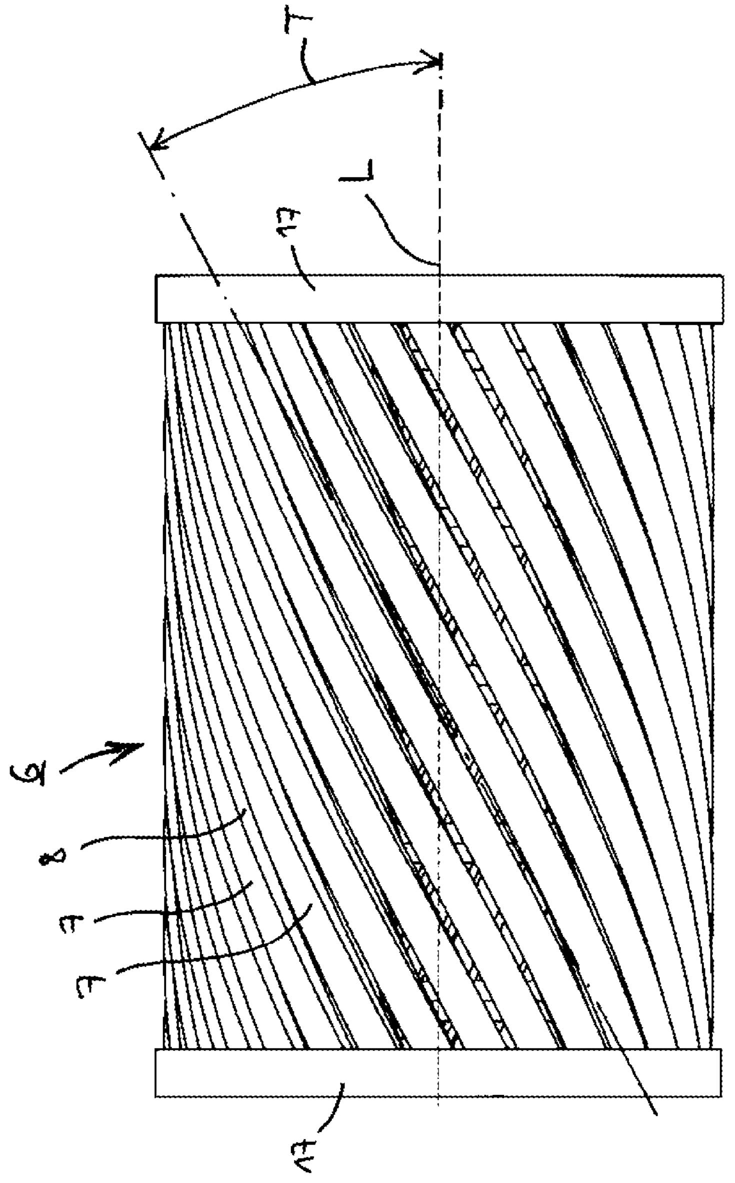
FIG. 14 shows a variant of the invention in the form of an axial helical slit tube.
Figure 15:
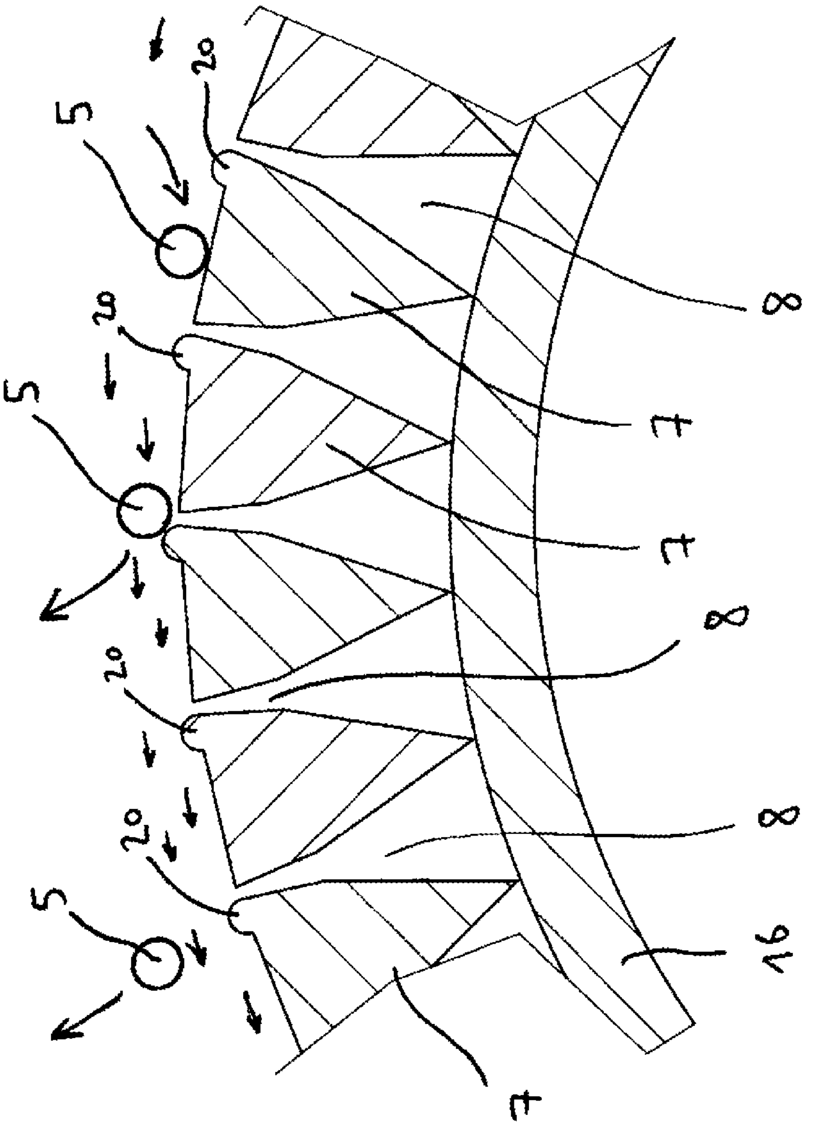
FIG. 15 shows a variant of the invention in which the disruptive geometry is designed differently, specifically as a strip protruding radially over the surroundings, like a spoiler.

The operating principle of the invention is explained by way of example with reference to FIGS. 10-13. Modifications are illustrated in FIGS. 14 and 15. The elements or regions appearing multiple times are provided with reference signs only by way of example, for reasons of clarity.

Figure 1:
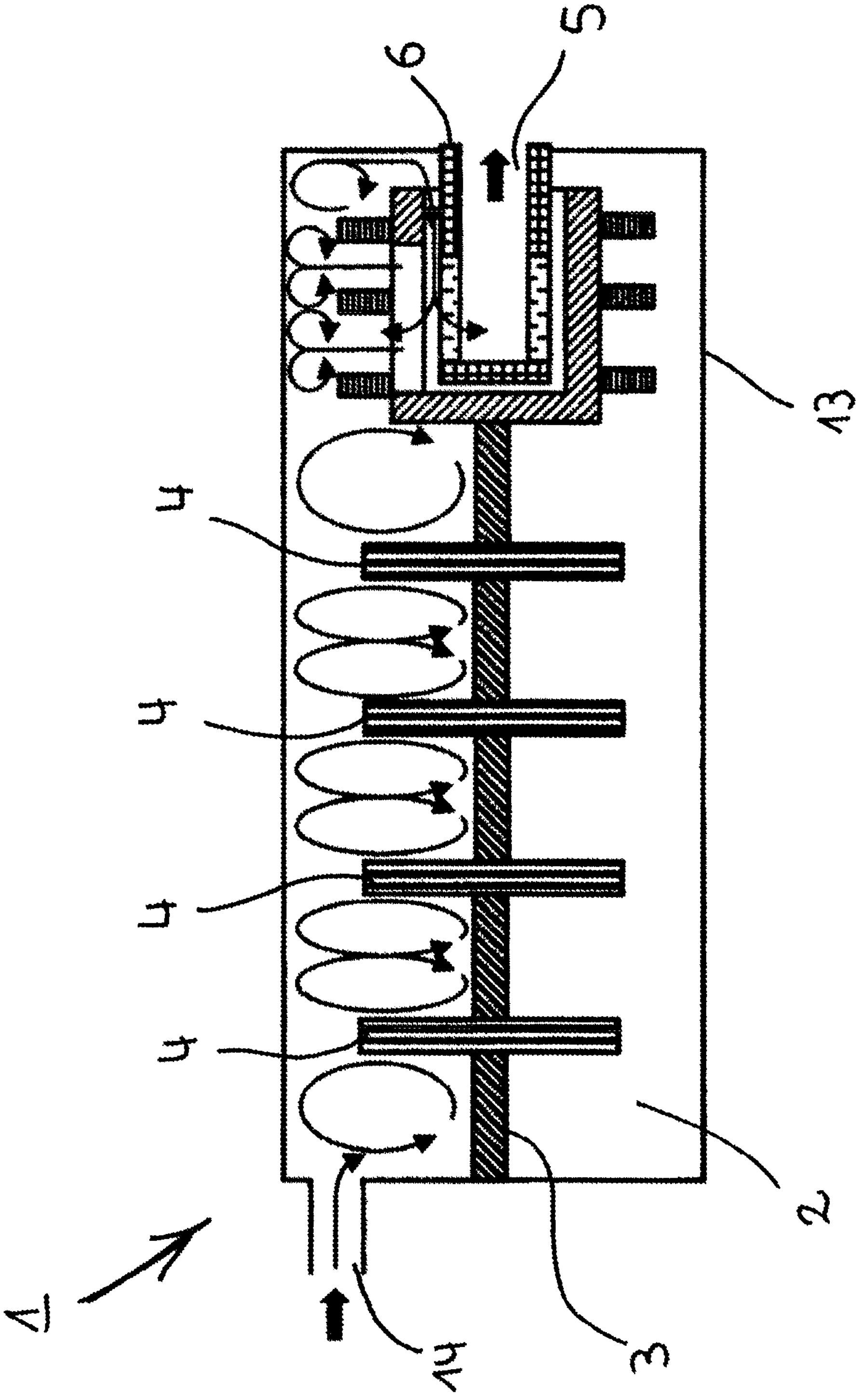
FIG. 1 schematically shows an agitator mill known from the prior art, on which the slit tubes according to the invention are used.
Figure 2:
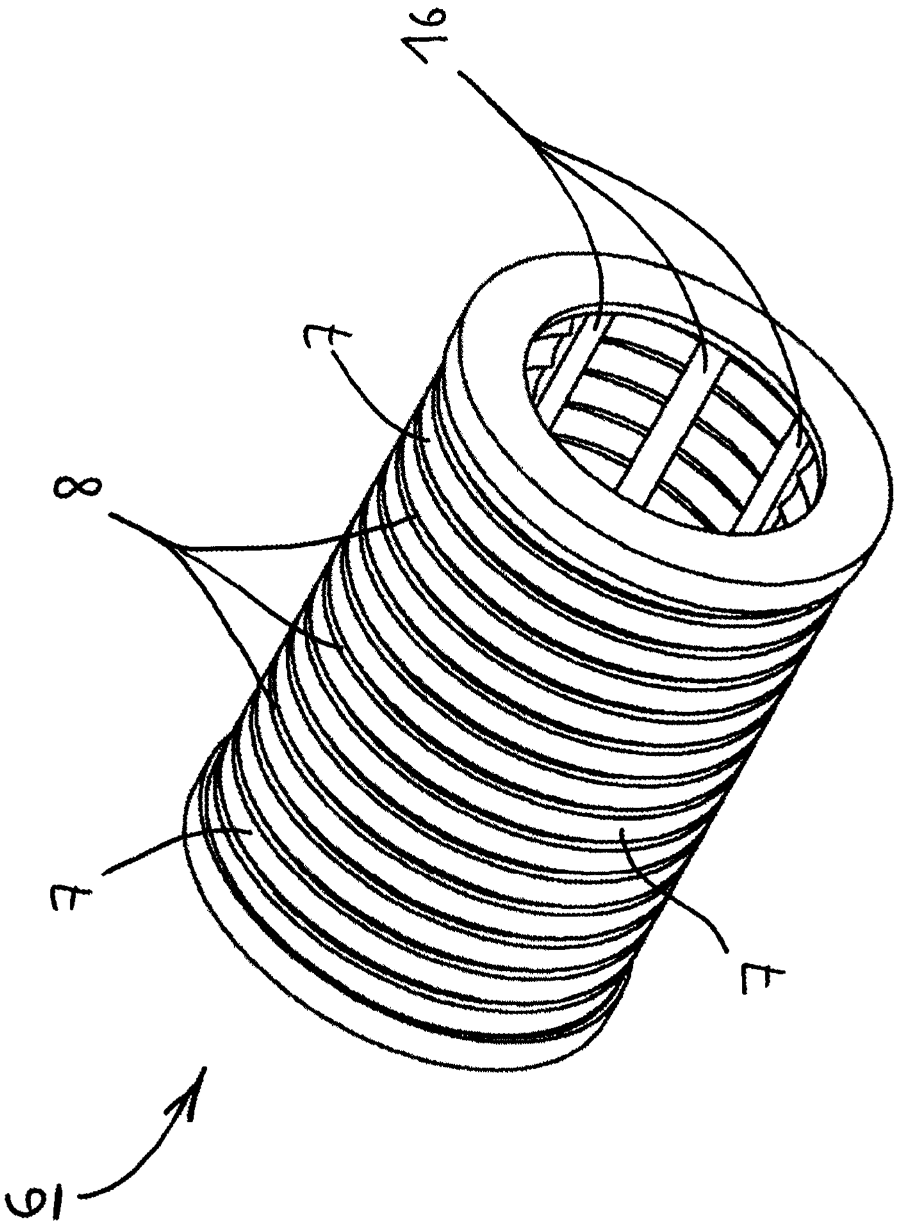
FIG. 2 shows a non-inventive radial slit tube in an isometric view.
Figure 3:
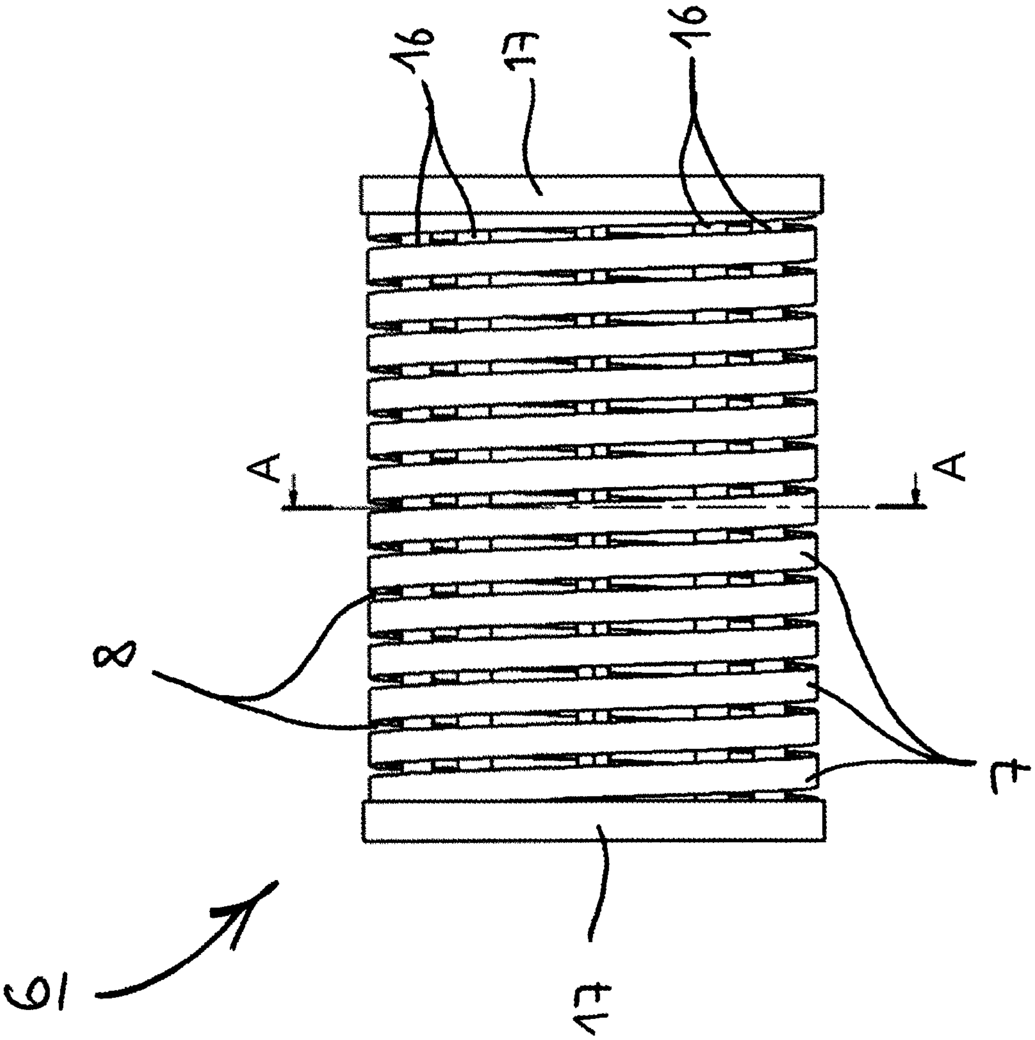
FIG. 3 shows the radial slit tube from FIG. 2 in a side view.
Figure 4:
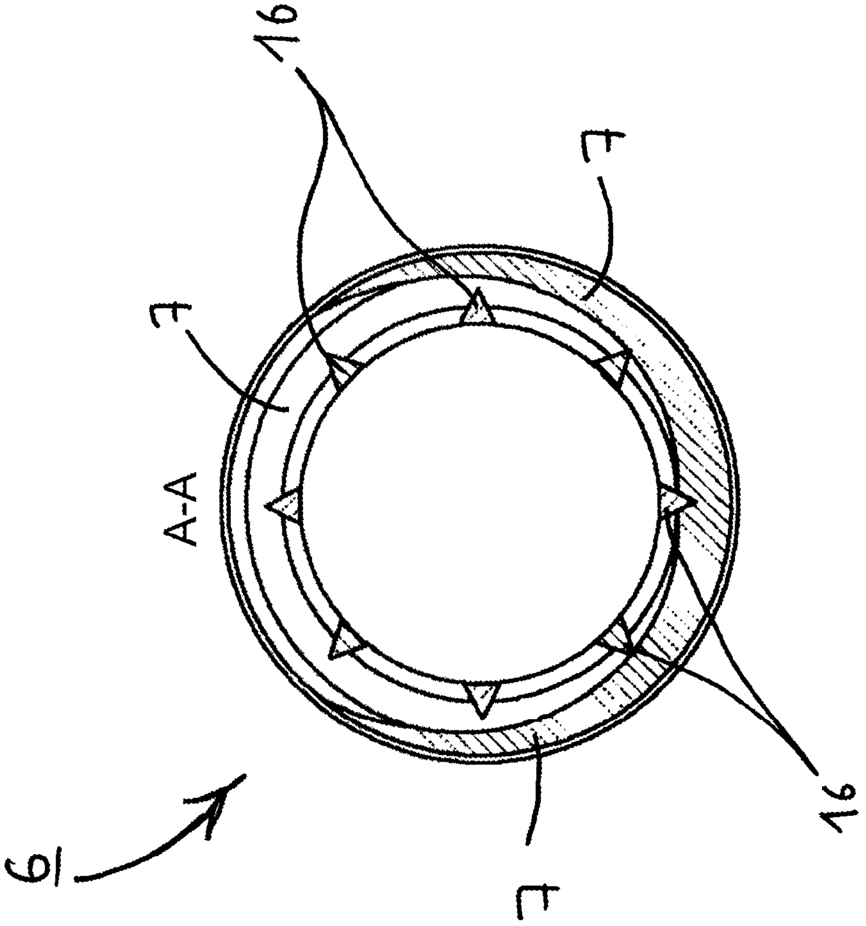
FIG. 4 shows the radial slit tube from FIG. 2 in cross-section.
Figure 5:
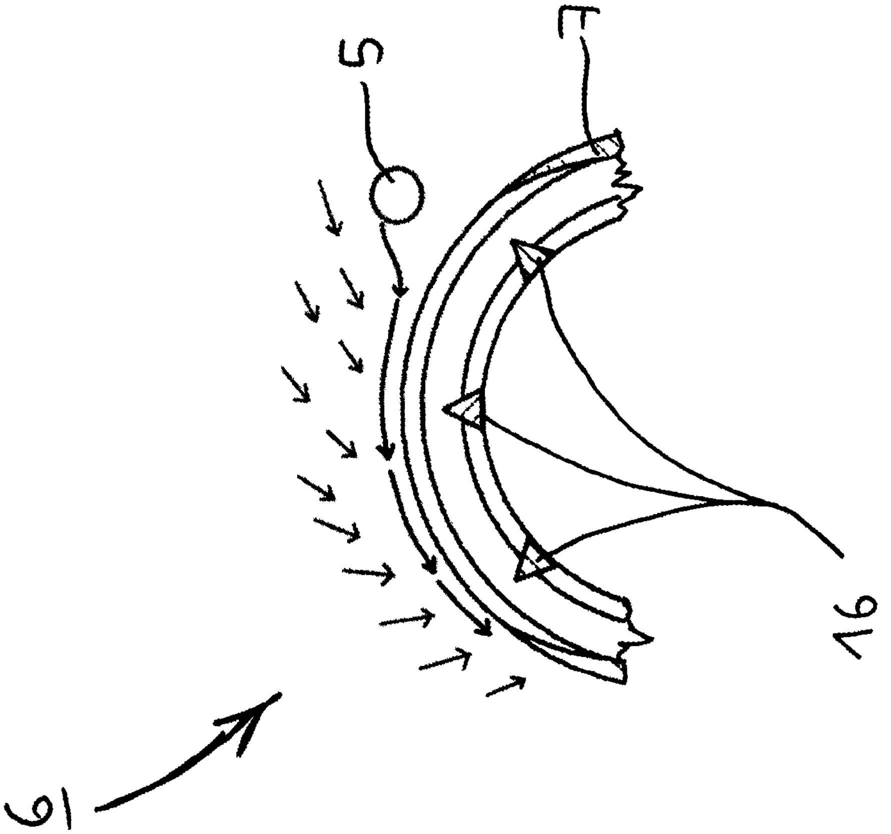
FIG. 5 shows the movement of a milling element in the region of the radial slit tube from FIG. 2.
Figure 6:
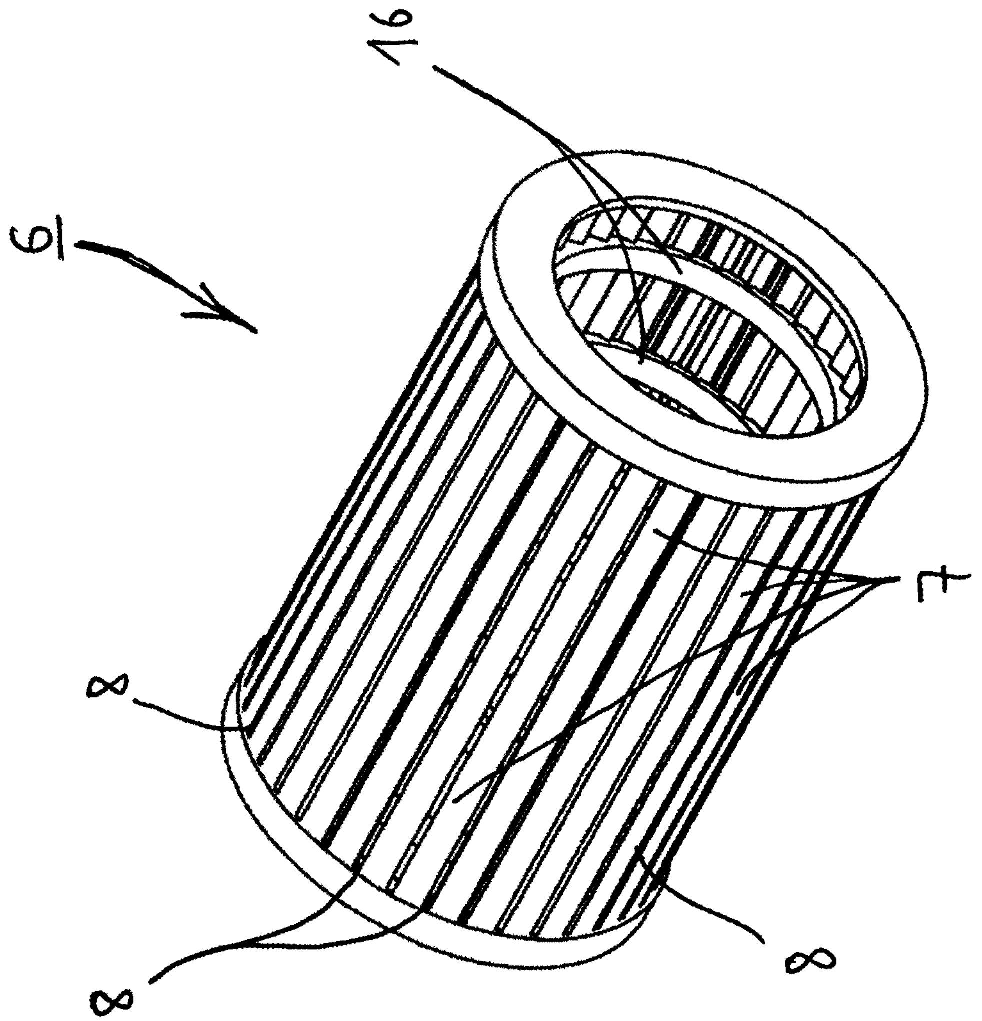
FIG. 6 shows a non-inventive axial slit tube in an isometric view.
Figure 7:
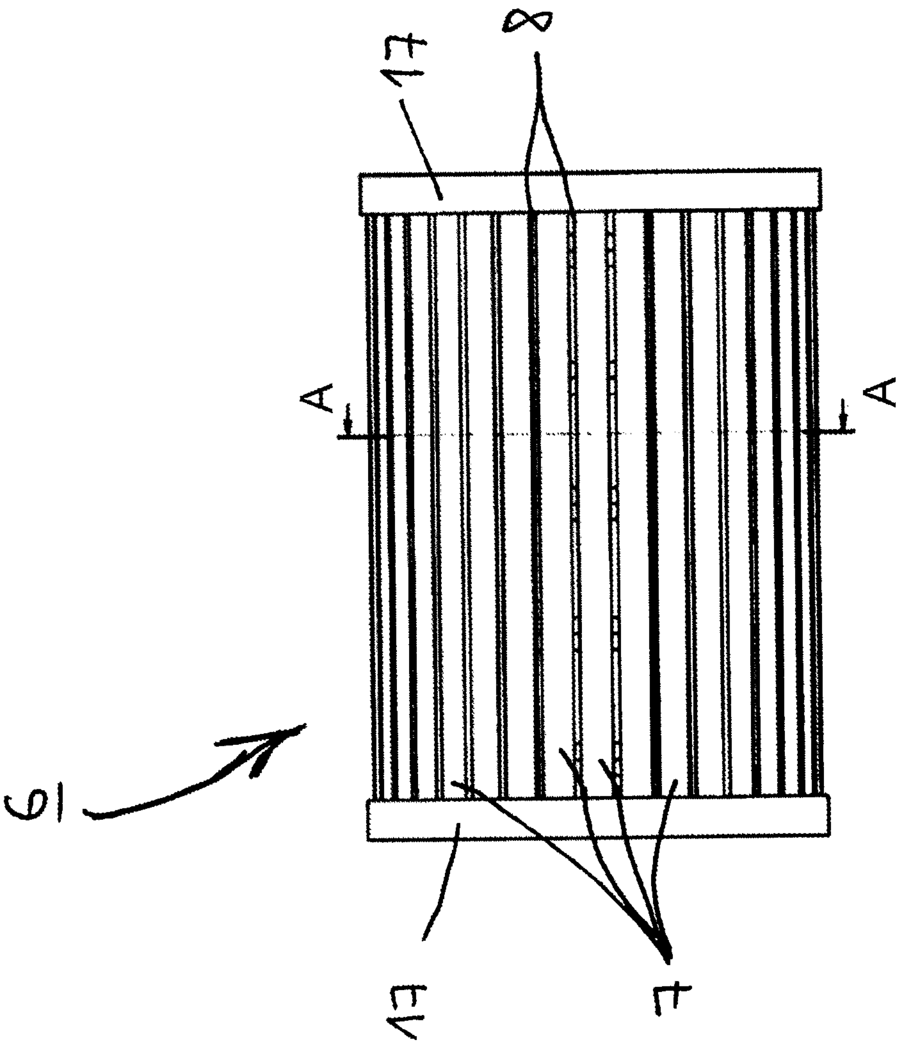
FIG. 7 shows the axial slit tube from FIG. 6 in a side view.
Figure 8:
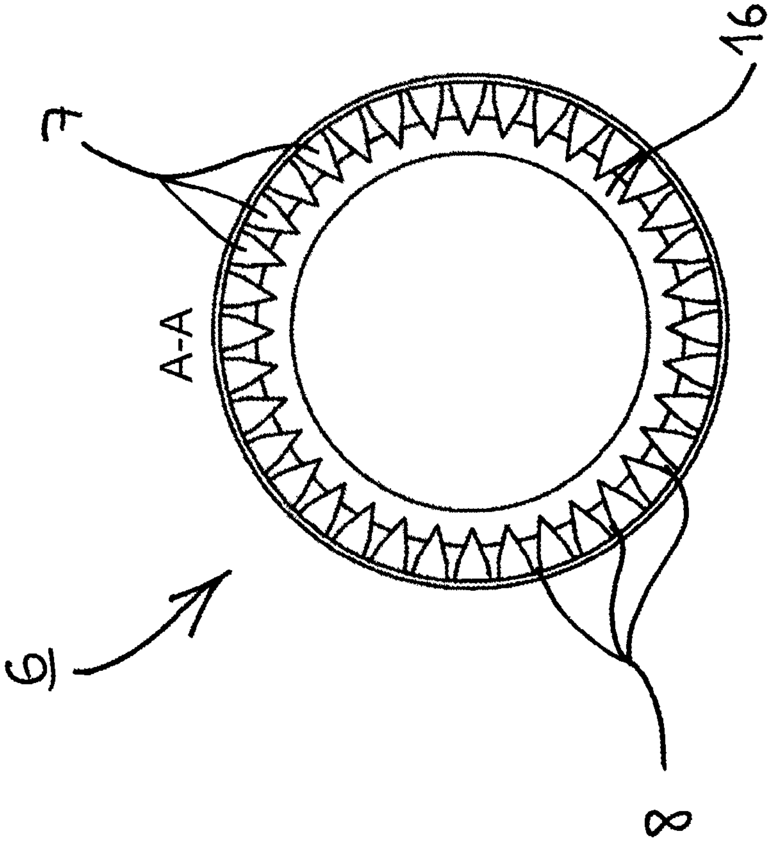
FIG. 8 shows the axial slit tube from FIG. 6 in cross-section.
Figure 9:
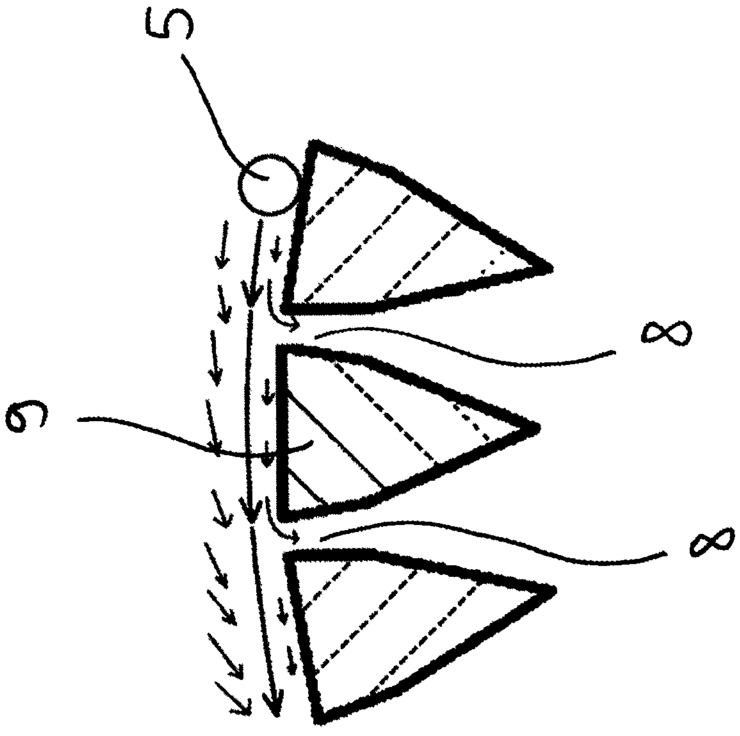
FIG. 9 shows the movement of a milling element in the region of the non-inventive axial slit tube from FIG. 6.
Figure 10:
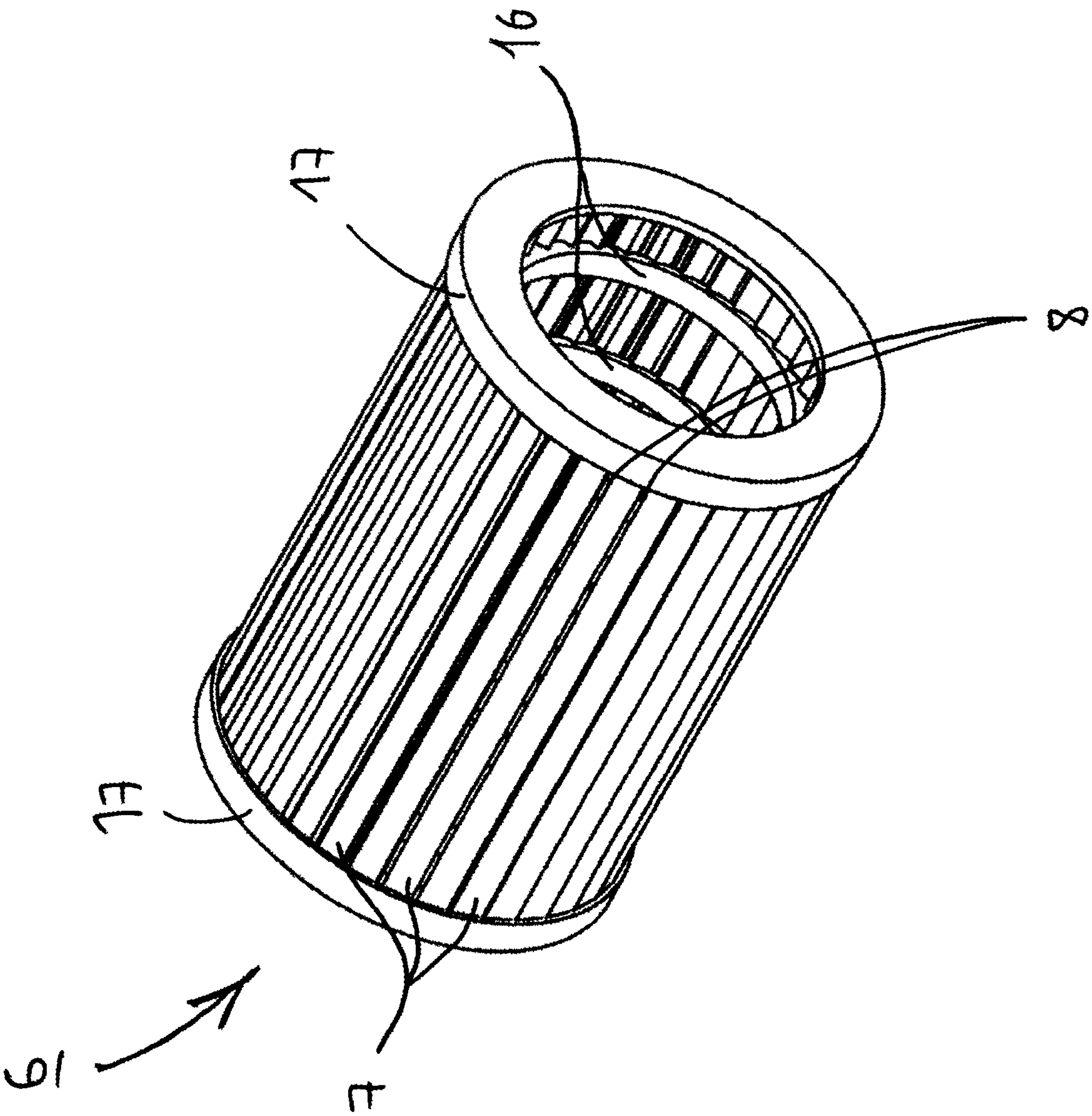
FIG. 10 shows an axial stepped slit tube according to the invention in an isometric view.
Figure 11:
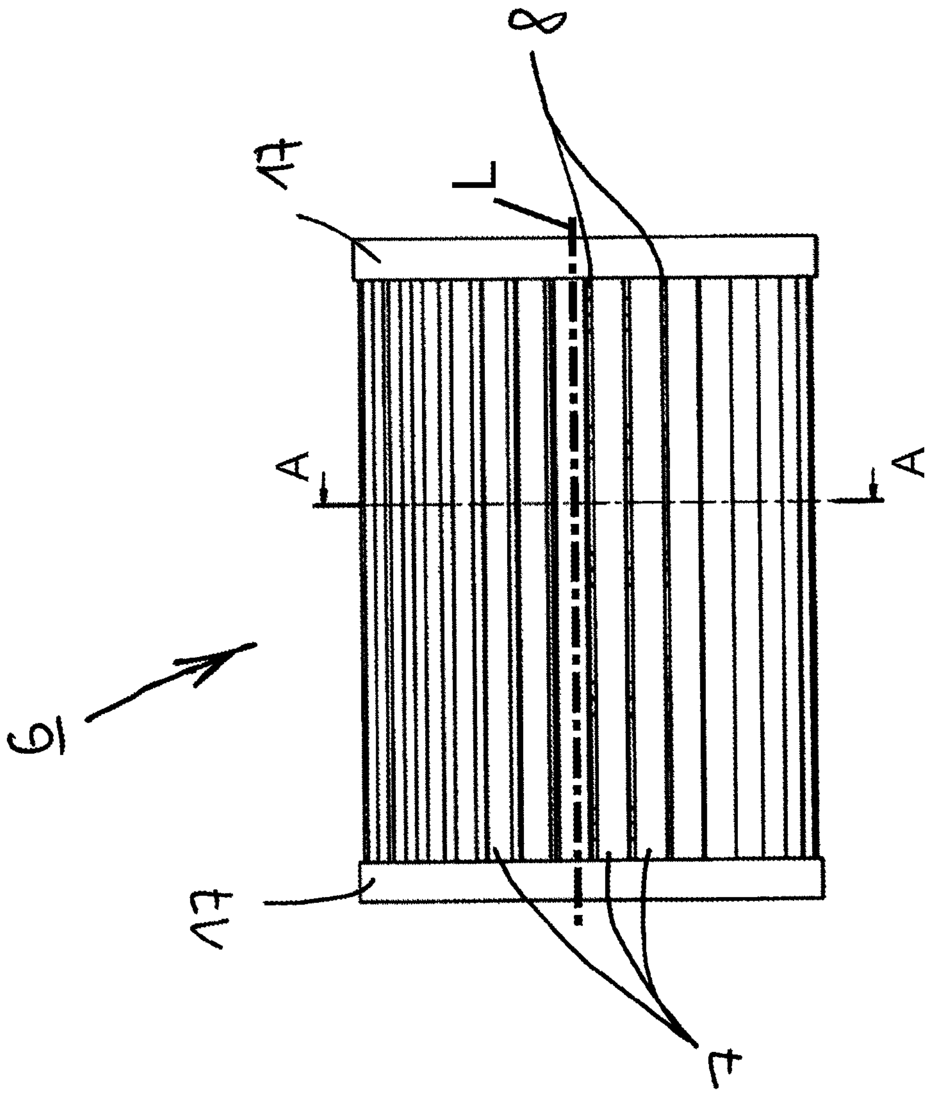
FIG. 11 shows the axial stepped slit tube according to the invention from FIG. 10 above in a side view.
Figure 12:
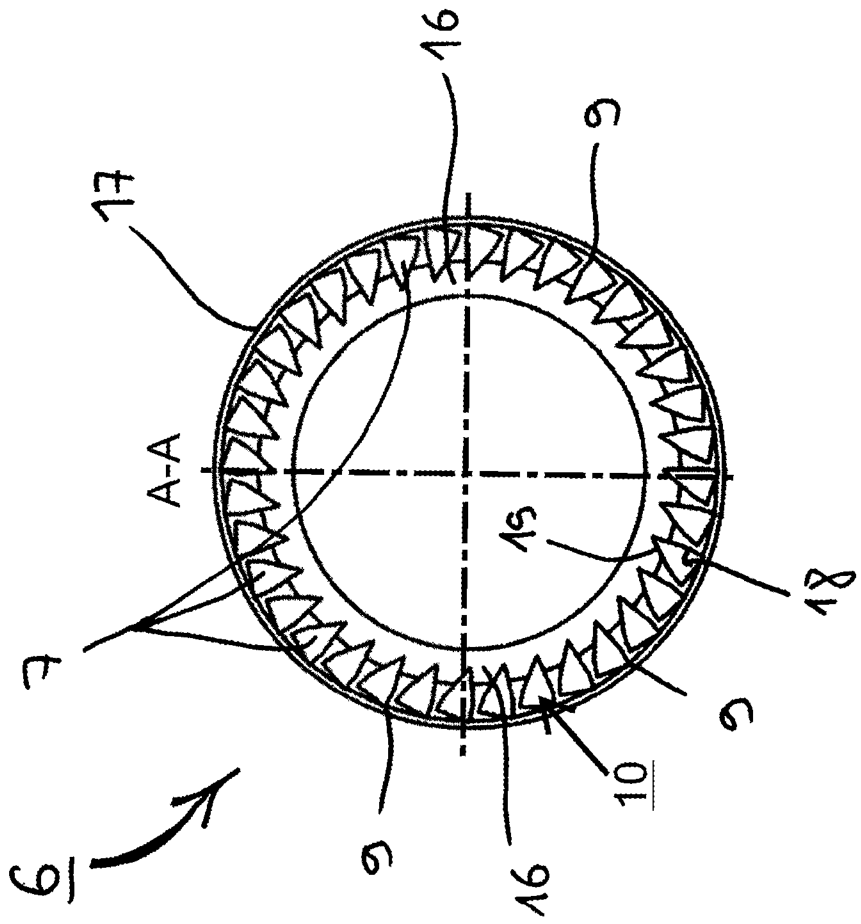
FIG. 12 shows the axial stepped slit tube according to the invention from FIG. 10 above in cross-section.
Figure 13:
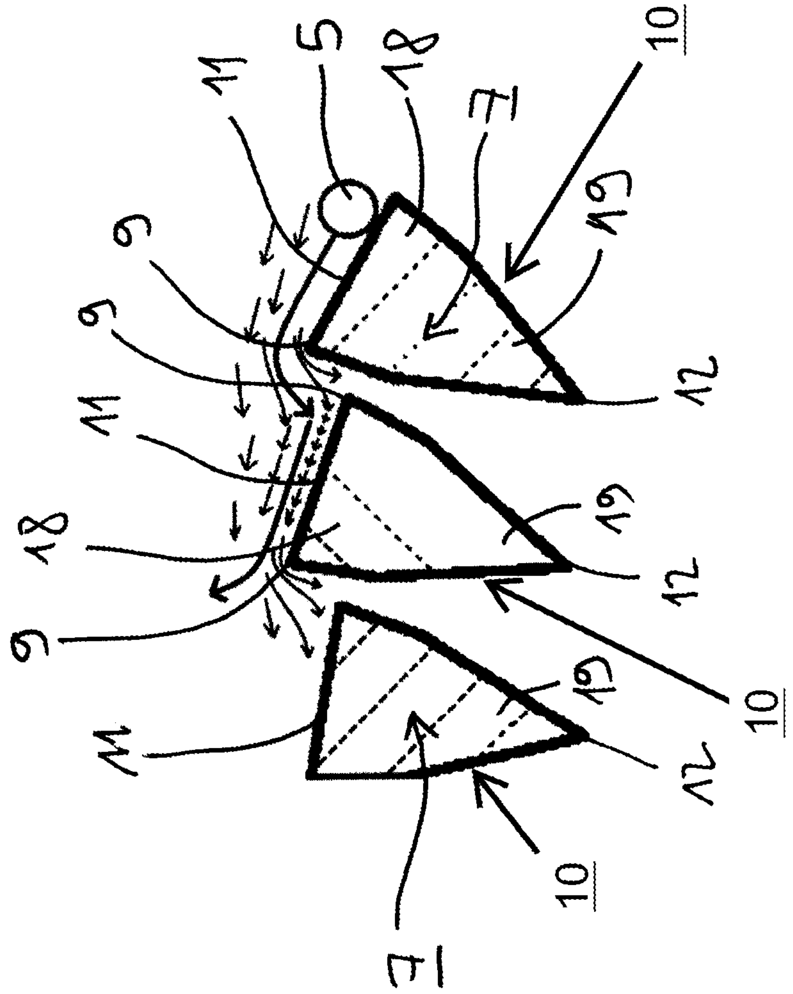
FIG. 13 shows the movement of a milling element in the region of the slit tube according to the invention from FIG. 10.

In the assembled state, the slit tube 6 is arranged in the outlet region of a agitator mill not shown in FIGS. 10-13; see also FIG. 1. It is used to allow the milled material to exit the milling chamber and at the same time to prevent the milling elements 5 from exiting the milling chamber. To this end, the slit tube 6 has a plurality of slits 8 on its outer circumferential face, which is composed of the outer circumferential faces 11 of the slit formers 7. The milled material flows through the slits 8 into the interior of the slit tube 6 and out from there via an open-end face of the slit tube 6. The slits 8 are so narrow that the milling elements 5 do not pass through them or substantially do not pass through them or do not easily pass through them.

The slit tube 6 is formed from the two end pieces 17, the slit formers 7 and the circular supports 16. The supports 16 are used to hold the slit formers 7 in position and in particular to increase their rigidity. They are formed from rings, ideally metal rings.

To achieve a sufficiently strong connection between the supports 16 and the slit formers 7, they are ideally welded to one another. The slit formers 7 are arranged at regular intervals around the supports 16, and a slit 8 in the form of a stepped slit is provided between the long edges 9 of two adjacent slit formers 7 in this clearly preferred exemplary embodiment.

In the assembled state, the end face of the slit tube 6 opposite the end face of the slit tube 6 through which the milled material flows away is ideally closed or at least covered, so that neither milled material nor milling elements can flow through it.

The slit formers 7 are formed by strips, the extent of which in the direction parallel to the longitudinal axis of the slit tube 6 is at least 10 times greater than their extent in the circumferential direction of the slit tube 6. Ideally, the strips are produced from wires or from drawn or extruded metal material.

The cross-sectional profile of the slit formers 7 is in this case a wedge 10, preferably in the form of a double wedge, which consists of the two wedge sections 18 and 19. The wedge section 19 is formed by a triangle, while the wedge section 18 is formed by a trapezium. The sides of the wedge sections merge into one another, wherein the double wedge 10 has a kink at the transition of the two wedge sections 18 and 19. This kink therefore means that the angle between the base 11 of the wedge 10 and the sides of the wedge section 18 is greater than the angle between the base 11 and the sides of the wedge section 19.

To prevent milling elements becoming wedged in the slits and blocking them, the slits 8 are in the form of stepped slits. It is explained how these are formed and what the result of this is with reference to FIGS. 12 and 13.

In the assembled state, the slit formers 7 are arranged around the longitudinal axis of the slit tube 6 such that the perpendicular on the base 11 and running through the wedge tip 12 does not run through the longitudinal axis of the slit tube 6. It is ideal if the two edges forming the same slit lie on different radii, the delta of which is preferably smaller than four and ideally two milling element diameters, however.

In other words: It can be preferred for the individual slit formers to be fixed, usually welded, like a row of dominoes tilting in the circumferential direction and to form the stepped slit tube in this way; see FIG. 12.

This means that the long edge 9 of a first slit former 7 is arranged on a larger radius around the longitudinal axis of the slit tube 6 than the long edge 9, facing this long edge 9, of the next slit former 7. As a result, the slit 8 between each pair of slit formers 7 is in the form of a stepped slit.

This type of positioning is easy to manage in manufacturing terms. The whole thing is also very advantageous from a wear standpoint, since the cross-sections of the slit formers are thick and therefore wear-resistant everywhere, much more wear-resistant than cross-sections from which a type of “spoiler” or “deflection lips” protrude as naturally finer extensions.

Therefore, milled material in this region flows under a milling element 5 rolling or sliding along a first slit former 7 as it crosses the long edge 9. Since the milled material between the milling element 5 and the slit former 7 flows more slowly than the milled material on the opposite side of the milling element 5, a negative pressure is produced according to Bernoulli in the region between the milling element 5 and the next slit former 7. This means that the milling element 5 is pushed away from the slit tube 6. Blockage of the slits 8 with milling elements is thus counteracted.

As already mentioned, the term axial slit tube has a narrower and a broader meaning according to the invention. In the narrower sense, it includes only slit tubes with slits having a longitudinal axis which runs (in any case substantially or even completely except for tolerance deviations) parallel to the central longitudinal axis L of the slit tube.

In a broader sense, however, it currently also covers slit tubes with slits running helically, which can therefore be referred to as axial helical slit tubes. This is illustrated in FIG. 14. Like the slits, the slit formers run helically, but are tilted into themselves, as described previously.

It should then be noted that the axial slit tube according to the invention can alternatively also have adjacent slit formers 7 which form a slit 8 between their two long edges 9 but form a different type of disruptive geometry. In the present case, the disruptive geometry is formed by a protrusion or spoiler. These are impacted by milling elements in the process of rolling or sliding in the circumferential direction along the outer circumferential face 11 of the alit tube 6 in order then to bounce off in a diagonal radially outward direction and in this manner to be prevented from blocking the slits. This solution functions according to the invention but is subject to much higher wear in some applications owing to the higher impact effect of the milling elements.

The invention claimed is:

1. An agitator mill comprising:
a milling chamber;
a milling rotor, which forms an outer circumferential boundary wall of the milling chamber during operation;
milling elements, which are made to execute a milling movement in the milling chamber by the milling rotor; and
a slit tube inside the milling rotor for removing the milled material while separating out the milling elements, wherein the slit tube is an axial slit tube comprising a plurality of axially-extending adjacent slit formers, each pair of which form a slit between their two long edges, to which slit a disruptive geometry is assigned, which causes a milling element rolling or sliding in the circumferential direction along the outer circumferential face of the slit tube to lift off from the outer circumferential face defined by the slit formers as it crosses the slit.

2. The agitator mill, according to claim 1, wherein the disruptive geometry includes that the adjacent slit formers form a stepped slit between their two long edges, in the sense that the long edge, bounding the slit, of one slit former lies on a smaller radius than the long edge, bounding the same slit, of the other slit former.

3. The agitator mill according to claim 1, wherein the slit formers are strips, the cross-section of which, in relation to the rotational axis of the slit tube, in each case defines a flat structure, which is fixed to the slit tube such that there is no mirror symmetry relative to the rotational axis of the slit tube and/or relative to any plane of the slit tube, wherein the plane runs through the rotational axis of the slit tube.

4. The agitator mill according to claim 1, wherein the slit formers are strips, the cross-section of which, in relation to the rotational axis of the slit tube, becomes narrower and narrower in the radially inward direction as seen in the circumferential direction.

5. The agitator mill according to claim 1, wherein the slit formers are strips, the cross-section of which, in relation to the rotational axis of the slit tube, is in each case a wedge, the base of which, opposite the inner wedge tip, defines the outer circumferential face.

6. A method for use of a slit tube in an agitator mill comprising a milling chamber and a milling rotor, which forms an outer circumferential boundary wall of the milling chamber during operation, and milling elements, which are made to execute a milling movement in the milling chamber by the milling rotor, and a slit tube for removing the milled material while separating out the milling elements, wherein the slit tube is an axial slit tube, the adjacent slit formers of which form a slit between their two long edges, to which slit a disruptive geometry is assigned, which causes a milling element rolling or sliding in the circumferential direction along the outer circumferential face of the slit tube to lift off from the outer circumferential face defined by the slit formers as it crosses the slit, said method comprising:
inserting the slit tube into the milling rotor;
tumbling the milling elements and the material to be milled by rotating the milling rotor with the milling elements and the material to be milled inside the milling rotor; and
separating the milled material from the milling elements by the milled material passing through the slits of the slit tube while the milling elements do not pass through the slits.

7. The agitator mill according to claim 2, wherein the slit formers are strips, the cross-section of which, in relation to the rotational axis of the slit tube, in each case defines a flat structure, which is fixed to the slit tube such that there is no mirror symmetry relative to the rotational axis of the slit tube and/or relative to any plane of the slit tube, wherein the plane runs through the rotational axis of the slit tube.

8. The agitator mill according to claim 2, wherein the slit formers are strips, the cross-section of which, in relation to the rotational axis of the slit tube, becomes narrower and narrower in the radially inward direction as seen in the circumferential direction.

9. The agitator mill according to claim 1, wherein the slit formers are strips, the cross-section of which, in relation to the rotational axis of the slit tube, is in each case a double wedge with at least two wedge sections, the base of which, opposite the inner wedge tip, defines the outer circumferential face.

* * * * *